United States Patent

Kim et al.

[11] Patent Number: 5,157,981
[45] Date of Patent: Oct. 27, 1992

[54] MOTION LEVER

[76] Inventors: Chang H. Kim, 1600 Slauson Ave. #27-H, Los Angeles, Calif. 90047; George Spector, 233 Broadway RM 3815, New York, N.Y. 10007

[21] Appl. No.: 706,183
[22] Filed: May 28, 1991
[51] Int. Cl.⁵ .............................. F16H 27/02
[52] U.S. Cl. .............................. 74/89; 74/106
[58] Field of Search .................. 74/89, 106, 520

[56] References Cited

U.S. PATENT DOCUMENTS

| 1,525,989 | 2/1925 | Hill | 74/106 |
| 2,587,746 | 3/1952 | May | 74/520 |
| 4,236,583 | 1/1980 | Geurts | 74/520 X |
| 4,487,132 | 12/1984 | Fuchs et al. | 74/89 X |
| 4,681,022 | 7/1987 | Schwing | 74/106 X |
| 4,771,643 | 9/1988 | Mott | 74/520 X |

Primary Examiner—Allan D. Herrmann
Assistant Examiner—David W. Laub

[57] ABSTRACT

A device for producing reciprocating motion is provided and consists of a rotating weight that is forwardly driven along an elongated track to a suspended triangular frame track member thereby causing the triangular frame track member to move down and up in a vertical reciprocating motion which can then be transferred to an external member to perform useful work.

1 Claim, 1 Drawing Sheet

MOTION LEVER

BACKGROUND OF THE INVENTION

The instant invention relates generally to motors and more specifically it relates to a device for producing reciprocating motion which provides converting the forward driven motion of a rotating weight into a vertical reciprocating motion which can then be transferred to an external member to perform useful work.

There are available various conventional motors which do not provide the novel improvements of the invention herein disclosed.

SUMMARY OF THE INVENTION

A primary object of the present invention is to provide a device for producing reciprocating motion that will overcome the shortcomings of the prior art devices.

Another object is to provide a device for producing reciprocating motion by converting the forward driven motion of a rotating weight into a vertical reciprocating motion which can then be transferred to an external member to perform useful work.

An additional object is to provide a device for producing reciprocating motion in which the rotating weight can move onwards to another higher level to repeat the movement again.

A further object is to provide a device for producing reciprocating motion that is simple and easy to use.

A still further object is to provide a device for producing reciprocating motion that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
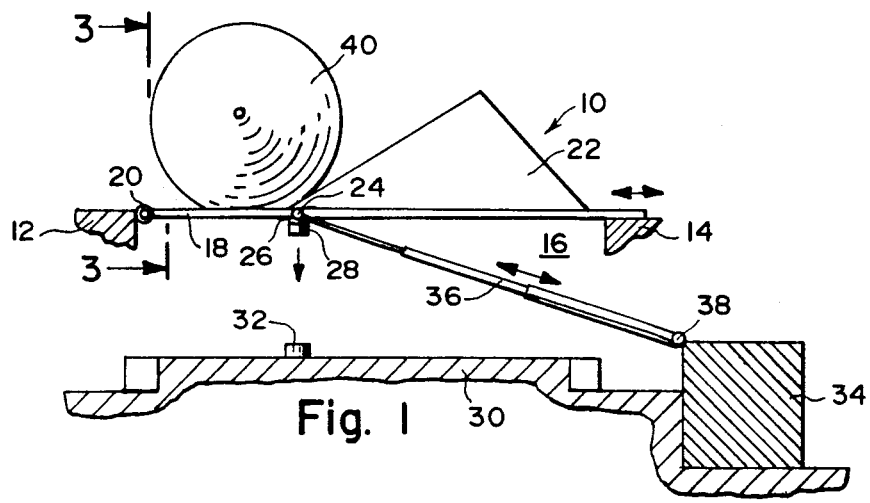
FIG. 1 is a diagrammatic side view of the instant invention showing a rotating weight starting to apply pressure again the triangular frame member.

Turning now descriptively to the drawings, in which similar reference characters denote similar elements throughout the several views, the Figures illustrate a device 10 for producing reciprocating motion consisting of a pair of stationary structures 12, 14, horizontally spaced apart to form an open span 16 therebetween. An elongated track 18 is pivotally connected at a first end 20 to the first stationary structure 12 so that it can extend towards the second stationary structure 14 in the open span 16. A triangular frame track member 22 is pivotally connected to a second end 24 of the elongated track 18 so that it can extend and slide over the second stationary structure 14.

A spring 26 is on the second pivot end 24 so as to normally keep the elongated track 18 and the triangular frame track member 22 in a horizontal position. A movable contact member 28 is disposed to and below the second pivot end 24. A third stationary structure 30 is positioned below the open span 16 between the first and second stationary structures 12 and 14.

A stationary contact member 32 is carried on the third stationary structure below the movable contact member 28. A fixed housing 34 is carried on the third stationary structure 30 at one side thereof. Telescopic guide arm 36 is pivotally connected at 38 to the fixed housing 34 so that it can extend across to engage with the second pivot end 24. A double cone shaped rotating weight 40 is driven by an external force (not shown) to travel upon the elongated track 18 so that when it reaches the triangular frame track member 22 it will cause the movable contact member 28 to move downwardly to engage the stationary contact member 32. When the rotating weight 40 continues to travel higher over the triangular frame track member 22 as seen in dotted lines (FIG. 2) the spring 26 will help return the elongated track 18 and the triangular frame track member 22 back to their original horizontal position. This will also cause the movable contact member 28 to move upwardly away from the stationary contact member 32 as the weight moves upward and as guided by the telescopic guide arm 36, thereby producing a vertical reciprocating motion which can then be transferred to an external member (not shown) to perform useful work.

Figure 2:
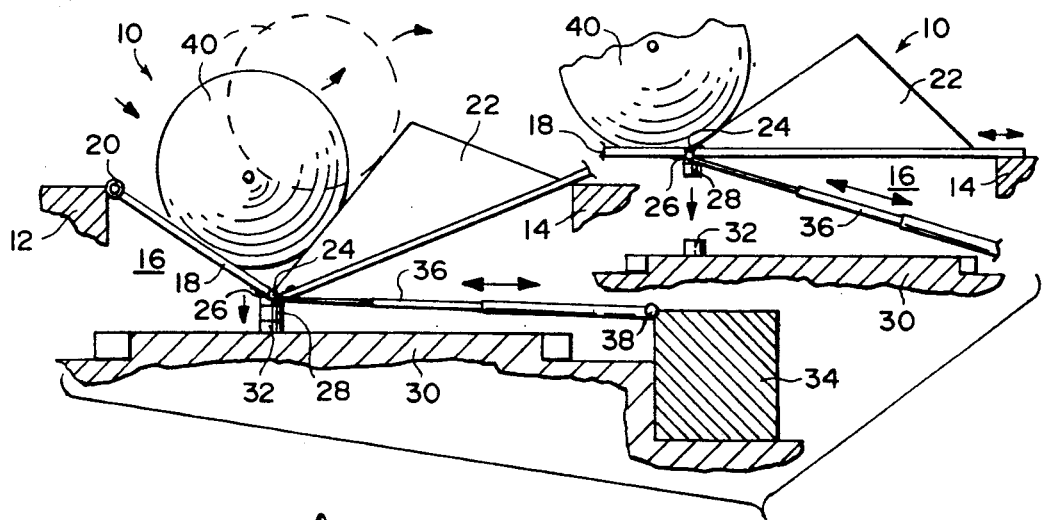
FIG. 2 is a diagrammatic side view similar to FIG. 1, showing the track moving down to the stationary contact member and the rotating ring weight moving onwards to another system to repeat the movement again.
Figure 3:
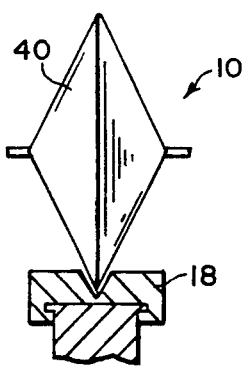
FIG. 3 is an enlarged cross sectional view taken along line 3—3 in FIG. 1, showing the rotating weight riding in the track in greater detail.

As shown in FIG. 2, the rotating weight will then move downward to pivot end 24 causing downward movement of contact member 28. Momentum will cause the weight 40 to roll upward on track 18 allowing contact member to move upward. When weight 40 reaches a predetermined maximum height on track 18 the external force (not shown) will move weight 40 to contact member 28 to repeat the cycle of reciprocating motion which can also be transferred to an external member (not shown) to perform the useful work.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A device for producing reciprocating motion which comprises:
   a) first and second stationary structures, horizontally spaced apart to form an open span therebetween;
   b) an elongated tract with first and second ends pivotally connected at said first end to said first stationary structure so that it extends towards said second stationary structure in the open span;
   c) a triangular frame track member pivotally connected to said second end of said elongated track so that it can extend and slide over said second stationary structure;
   d) a spring at said second end pivotally biasing said track so as to normally keep said track and said triangular frame track member in a horizontal position;
e) a movable contact member disposed to and below said second end;
f) a third stationary structure positioned below said open span;
g) a stationary contact member carried on said third stationary structure below said movable contact member;
h) a fixed housing carried on said third stationary structure at one side thereof;
i) a telescopic guide arm pivotally connected to said fixed housing so that it can extend across to engage with said second end; and
j) a double cone shaped rotating weight driven by an external force to travel upon said elongated track so that when it reaches said triangular frame track member it will cause said movable contact member to move downwardly to engage said stationary contact member and when said rotating weight continues to travel upwards on said triangular frame track member said spring will help return said elongated track and said triangular frame track member back towards their original horizontal position allowing said movable contact member to move upwardly away from said stationary contact member as guided by said telescopic guide arm, return downward of said weight will produce a vertical reciprocating motion which is maintained by repeated applications of said external force on said weight at appropriate intervals.

* * * * *